(12) United States Patent
Radakovic et al.

(10) Patent No.: US 8,064,696 B2
(45) Date of Patent: Nov. 22, 2011

(54) GEOMETRIC PARSING OF MATHEMATICAL EXPRESSIONS

(75) Inventors: Bogdan Radakovic, Belgrade (YU); Goran Predovic, Belgrade (YU); Bodin Dresevic, Belgrade (YU)

(73) Assignee: Microsoft Corporation, Redmond, WA (US)

( * ) Notice: Subject to any disclaimer, the term of this patent is extended or adjusted under 35 U.S.C. 154(b) by 1073 days.

(21) Appl. No.: 11/784,889

(22) Filed: Apr. 10, 2007

(65) Prior Publication Data

US 2008/0253657 A1 Oct. 16, 2008

(51) Int. Cl.
*G06K 9/00* (2006.01)
(52) U.S. Cl. .......................................... 382/181
(58) Field of Classification Search ................... 382/181
See application file for complete search history.

(56) References Cited

U.S. PATENT DOCUMENTS

| | | | |
|---|---|---|---|
| 5,627,914 A | 5/1997 | Pagallo | |
| 6,336,094 B1 | 1/2002 | Ferguson et al. | |
| 6,665,436 B2* | 12/2003 | Su et al. | 382/177 |
| 7,778,464 B2* | 8/2010 | Lee et al. | 382/185 |
| 2004/0015342 A1 | 1/2004 | Garst | |
| 2004/0054701 A1 | 3/2004 | Garst | |
| 2005/0044295 A1 | 2/2005 | Wakeam et al. | |
| 2006/0062471 A1 | 3/2006 | Xu et al. | |
| 2006/0280370 A1 | 12/2006 | Viola et al. | |

OTHER PUBLICATIONS

Liang, et al., "Efficient Geometric Algorithms for Parsing in Two Dimensions", Date: 2005, http://research.microsoft.com/~viola/Pubs/DocExtract/docGeom_ICDAR2005.pdf.
Laviola Jr., et al., "MathPad2: A System for the Creation and Exploration of Mathematical", http://delivery.acm.org/10.1145/1020000/1015741/p432-laviola.pdf?key1=1015741&key2=5277261711&coll=&dl=ACM&CFID=15151515&CFTOKEN=6184618.
Matsakis Nicholas E., "Recognition of Handwritten Mathematical Expressions", http://www.ai.mit.edu/projects/natural-log/papers/matsakis-MEng-99.pdf.
Shilman, et al., "Recognition and Grouping of Handwritten Text in Diagrams and Equations", Date: 2004, http://ieeexplore.ieee.org/iel5/9414/29882/01363972.pdf.
US 7,092,574, 08/2006, Suzuki et al. (withdrawn)

\* cited by examiner

*Primary Examiner* — Daniel Mariam
*Assistant Examiner* — Elisa M Rice
(74) *Attorney, Agent, or Firm* — Capitol City TechLaw; Richard C. Irving

(57) ABSTRACT

A processing device may parse a group of strokes representing a mathematical expression. The group of strokes may be examined to determine whether the group of strokes satisfies any of a finite set of rules. When the group of strokes, included in a region, satisfies any of the finite set of rules, the region may be partitioned according to a satisfied one of the finite set of rules. The group of strokes included in the region may be further examined to determine whether the group of strokes may be further partitioned according to any of the finite set of rules. After all regions have been examined and no further partitioning of regions may be performed, all mathematical symbols of the mathematical expression may be isolated in at least some of the regions and may be recognized.

20 Claims, 8 Drawing Sheets

{1, 2, 3, 4, 5, 6, 7, 8, 9} → [{1, 2}, {3, 4, 5, 6, 7, 8, 9}] (OUTSIDE-INSIDE)
{4, 3, 7, 5, 6, 8, 9} → [{4, 3, 7, 5, 6, 8}, {9}] (TOP-DOWN, SIMPLE STRONG CONDITION)
{4, 3, 7, 5, 6, 8, 9} → [{4, 3, 7, 5, 6}, {8, 9}] (TOP-DOWN, FRACTION CONDITION)
{4, 3, 7, 5, 6, 8} → [{4, 3, 7, 5, 6}, {8}] (TOP-DOWN, FRACTION CONDITION)
{3, 4, 6, 5, 7} → [{3, 4, 6, 5}, {7}] (LEFT-RIGHT, SIMPLE STRONG CONDITION)
{3, 4, 6, 5, 7} → [{3, 4}, {6, 5, 7}] (LEFT-RIGHT, SIMPLE STRONG CONDITION)
{3, 4, 6, 5, 7} → [{3}, {4, 6, 5, 7}] (LEFT-RIGHT, SUPERSCRIPT CONDITION)
{8, 9} → [{8}, {9}] (TOP-DOWN, SIMPLE STRONG CONDITION)
{3, 4, 6, 5} → [{3, 4,}, {6, 5}] (LEFT-RIGHT, SIMPLE STRONG CONDITION)
{3, 4, 6, 5} → [{3}, {4, 6, 5}] (LEFT-RIGHT, SUPERSCRIPT CONDITION)
{6, 5, 7} → [{6, 5}, {7}] (LEFT-RIGHT, SIMPLE STRONG CONDITION)
{4, 6, 5, 7} → [{4, 6, 5}, {7}] (LEFT-RIGHT, SIMPLE STRONG CONDITION)
{4, 6, 5, 7} → [{4}, {6, 5, 7}] (LEFT-RIGHT, SIMPLE STRONG CONDITION)
{3, 4} → [{3}, {4}] (LEFT-RIGHT, SUPERSCRIPT CONDITION)
{4, 6, 5} → [{4}, {6, 5}] (LEFT-RIGHT, SIMPLE STRONG CONDITION)

*FIG. 10*

$R = \{1, 2, 3, 4, 5, 6, 7, 8, 9\}$ — INPUT REGION
$R_1 = \{1, 2\}$ — SQUARE ROOT SYMBOL
$R_2 = \{3, 4, 5, 6, 7, 8, 9\}$
$R_3 = \{9\}$ — NUMBER 2
$R_4 = \{3, 4, 5, 6, 7, 8\}$
$R_5 = \{8, 9\}$
$R_6 = \{3, 4, 5, 6, 7\}$
$R_7 = \{8\}$ — FRACTION LINE OPERATOR
$R_8 = \{3, 4, 5, 6\}$
$R_9 = \{7\}$ — NUMBER 1
$R_{10} = \{3, 4\}$
$R_{11} = \{5, 6, 7\}$
$R_{12} = \{3\}$ — SYMBOL β
$R_{13} = \{4, 5, 6, 7\}$
$R_{14} = \{4, 5, 6\}$
$R_{15} = \{5, 6\}$ — OPERATOR +
$R_{16} = \{4\}$ — NUMBER 2

*FIG. 11*

GEOMETRIC PARSING OF MATHEMATICAL EXPRESSIONS

BACKGROUND

Many state-of-the-art processing devices, such as, for example, a tablet personal computer (PC), or other processing device, permit a user to provide input as digital ink. The digital ink may include one or more handwritten strokes, which a processing device may display as ink as the one or more handwritten strokes are input. A handwritten stroke may begin when a writing instrument lands on a writing surface, and may end when the writing instrument is lifted off the writing surface. The writing surface may include a display screen, which may further include a digitizer, and the writing instrument may be an electronic or non-electronic pen, a stylus, a user's own finger, a pointing device, such as, for example, a computer mouse, or another writing instrument.

A user may input one or more handwritten strokes, as digital ink, to form a two-dimensional structure. The two-dimensional structure may include a mathematical expression, a chemical formula, textual characters, numbers, or other two-dimensional structures.

One problem with respect to recognizing handwritten mathematical expressions is parsing. Parsing is a process in which an input sequence is analyzed in order to determine its structure, such as, for example, mathematical objects included in a mathematical expression. The input sequence may include a number of handwritten strokes or typeset mathematical symbols. In parsing, a terminal object, or atom is not dividable and may include only one stroke.

A region, R, may include a number of strokes, which are included in a mathematical expression. Separation of the number of strokes in a region into multiple regions is called partitioning. Existing parsing algorithms attempt to partition a region, R, including a number of strokes, into two regions, $R_1$ and $R_2$, each of which may include a subset of the strokes of the region, R. The parsing algorithms may further partition region $R_1$ into two regions, $R_{11}$ and $R_{12}$, each of which may include a subset of the strokes of region $R_1$. The parsing algorithms may further partition region $R_2$ into two regions, $R_{21}$ and $R_{22}$, each of which may include a subset of the strokes of region $R_2$.

In general, if region R can be divided into regions $R_1$ and $R_2$, such that $R_1 \cap R_2 = 0$, $R_1 \cup R_2 = R$ and sub-regions $R_1$ and $R_2$ are not empty, then regions $R_1$ and $R_2$ create a partition $P = [R_1, R_2]$ of the region R. A number of all possible partitions of the region R may be exponential in relation to a number of terminal objects. As an example, if region R includes N terminal objects, then a number of all sub-regions is $2^N - 2$ (this includes all subsets of a region R not including itself and an empty set), which is exponential. A method which analyzes an exponential number of sub-regions created from a single region is time-consuming and unpractical. Therefore, existing parsing algorithms include rules to prune a number of regions and partitions created.

Previous methods of partitioning a region fail under certain circumstances. For example, a Rectangle Hull Region (RHULL), which is defined as a smallest axis aligned rectangle which includes one or more strokes, cannot be used to separate a square-root symbol from the one or more objects upon which the square-root symbol acts. For example, with respect to "$\sqrt{X}$", "$\sqrt{}$" cannot be separated from "X".

An object is convex if for every pair of points within the object, every point on a straight line segment that joins each of the pair of points is within the object. A Convex Hull Region (CHULL), is defined as a smallest convex region which contains one or more strokes. A first version of Convex Hull Region (CHULL1) creates a partition if and only if:

$$CHULL(R_1) \cap CHULL(R_2) = 0.$$

A second version of Convex Hull Region (CHULL2) creates a partition if and only if:

$$CHULL(R_1) \cap R_2 = 0 \text{ or } R_1 \cap CHULL(R_2) = 0.$$

Among RHULL, CHULL1 and CHULL2, only CHULL2 is capable of parsing certain handwritten expression which include a superscript. However, RHULL, CHULL1 and CHULL2 are not capable of parsing a fraction when a portion of a numerator crosses a horizontal fraction line.

Although, CHULL2 is capable of parsing expressions which RHULL and CHULL cannot, one flaw of the CHULL2 parsing algorithm is that CHULL2 does not efficiently enumerate all partitions. An upper bound of complexity of CHULL2 is exponential.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a handwritten or typeset mathematical expression may be input to a processing device, such as, for example, a tablet PC, or other processing device. Handwritten input may be provided as a number of strokes, entered as digital ink, forming the mathematical expression. The handwritten or typeset input may be parsed accurately and in an efficient manner. A group of strokes representing a mathematical expression may be included in an input region for parsing. The strokes may be ordered according to one or more ordering relations and the strokes may be partitioned when the strokes satisfy at least one of a finite set of rules based, at least in part, on expected positioning of symbols and expected types of strokes. After each partitioning, the strokes in the region may be further examined to determine whether the strokes satisfy at least one of the finite set of rules. The region may be further partitioned when the strokes satisfy at least one of the finite set of rules. When the region cannot be further partitioned, each of the sub-regions may be examined, as a region, to partition each respective region when strokes of the respective region satisfy at least one of the finite set of rules. After all regions have been examined and no further partitioning may be performed, then all mathematical symbols of the mathematical expression may be isolated in at least some of the regions and may be recognized.

In some embodiments, the finite set of rules may include rules for partitioning based on detecting geometrically separate subsets of a region, detecting a superscript, detecting a subscript, detecting a bracket, detecting a horizontal or diagonal fraction line, and detecting a square root symbol.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 10 illustrates partitioning of regions when using the process of FIGS. 8A-8B to parse the mathematical expression of FIG. 9.

FIG. 11 shows all regions created when parsing the mathematical expression of FIG. 9 and further indicates mathematical symbols isolated in some of the regions.

DETAILED DESCRIPTION

Figure 1:
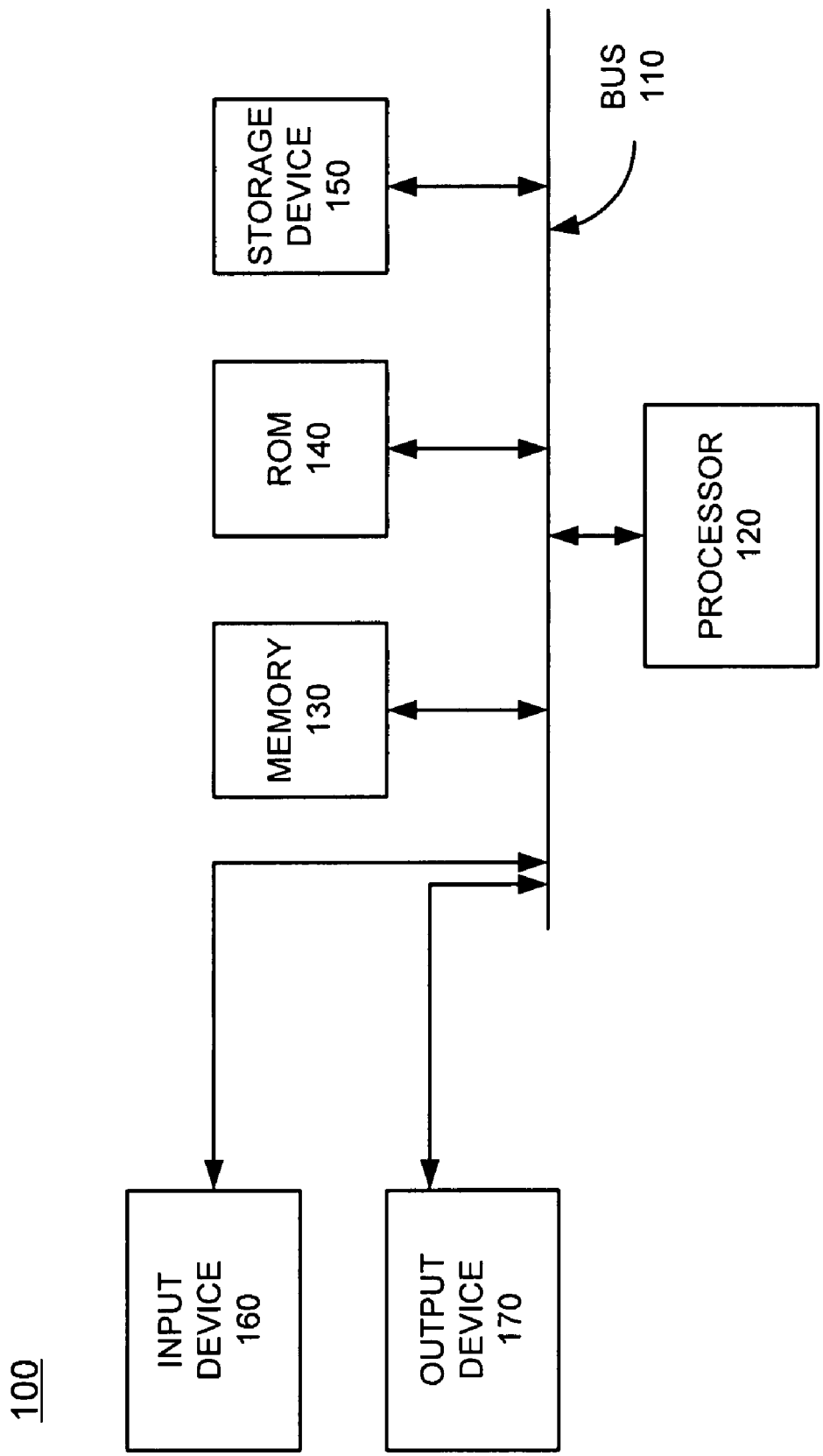
FIG. 1 is a functional block diagram of a processing device for implementing in embodiments consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a processing device and a method are provided which efficiently and correctly parse handwritten or typeset mathematical expressions input to a processing device, such as, for example, a tablet PC, or other processing device. A handwritten mathematical expression may be input to a processing device as a number of strokes, in an input region, forming a mathematical expression. The processing device may display the strokes as digital ink. In various embodiments, only partitions of the input region and its sub-regions, which satisfy one of a number of a finite set of rules may be enumerated. Thus, processing time may be reduced because a maximum number of possible regions to analyze are effectively pruned, while all regions from a correct parsing are enumerated.

With respect to this patent application, the term "strokes" may include handwritten input as well as typeset input. For example, a handwritten or typeset mathematical symbol may be considered to include one or more strokes.

In embodiments consistent with the subject matter of this disclosure, strokes, included in an input region and forming at least a portion of a mathematical expression, may be partitioned into two sub-regions, R1 and R2, if and only if R1 OrdRel R2 (i.e. R1 and R2 are in an ordering relation). Thus, in various embodiments, OrdRel may be defined as a left-right right ordering relation OR a top-down ordering relation OR an outside-inside ordering relation OR a diagonal ordering relation. Different or other ordering relations may be included in OrdRel.

Each of the ordering relations may further include at least one of a finite set of rules, based, at least in part, on expected positioning of symbols and expected types of strokes. Strokes included in a region may be partitioned into a number of regions, such as, for example, two regions in one embodiment, or another number of regions in other embodiments when at least one of the finite set of rules is satisfied. The region may be further analyzed to determine whether the region may be partitioned further into two other sub-regions (or another number of sub-regions in other embodiments), using the finite set of rules. The strokes of the input region may be ordered according to a different ordering relation and the partitioning of the region may again be performed when at least one of the finite set of rules is satisfied. Each sub-region may then be examined as a region to determine whether the region may be partitioned into two sub-regions (or another number of sub-regions), according to the finite set of rules. The partitioning may continue recursively, according to the finite set of rules, until no further partitioning may be achieved. Thus, in one embodiment, strokes included in a region may be partitioned into two regions until a region includes only a terminal object (in parsing, a terminal object may be a single stroke). That is, in one embodiment, a region may be partitioned into at most two regions in one partitioning operation.

After multiple ordering relations have been applied to the plurality of strokes and all partitions satisfying at least one of the finite set of rules have been determined, then mathematical symbols included in at least some of the regions created by partitioning, may be recognized.

Exemplary Processing Device

FIG. 1 is a functional block diagram that illustrates an exemplary processing device 100, which may be used to implement embodiments consistent with the subject matter of this disclosure. Processing device 100 may include a bus 110, a processing device 120, a memory 130, a read only memory (ROM) 140, a storage device 150, an input device 160, and an output device 170. Bus 110 may permit communication among components of processing device 100. Processing device 100 may be a desktop personal computer (PC), a notebook PC, a handheld processing device, a tablet PC, or other type of processing device.

Processing device 120 may include at least one conventional processing device or microprocessing device that interprets and executes instructions. Memory 130 may be a random access memory (RAM), a Flash memory, or another type of dynamic storage device that stores information and instructions for execution by processing device 120. Memory 130 may also store temporary variables or other intermediate information used during execution of instructions by processing device 120. ROM 140 may include a conventional ROM device or another type of static storage device that stores static information and instructions for processing device 120. Storage device 150 may include any type of media for storing data and/or instructions.

Input device 160 may include one or more conventional mechanisms that permit a user to input information to processing device 100, such as, for example, a keyboard, a mouse, a touch screen, or other input device. In some embodiments, input device 160 may include a touch screen and an instrument for writing on the touch screen. For example, input device 160 may include a writing instrument, such as, a user's own finger, a stylus, an electronic pen or a non-electronic pen, or other instrument. Output device 170 may include one or more conventional mechanisms that output information to the user, including one or more displays, or other output devices.

Processing device 100 may perform such functions in response to processing device 120 executing sequences of instructions contained in a tangible machine-readable medium, such as, for example, memory 130, or other medium. Such instructions may be read into memory 130 from another machine-readable medium, such as storage device 150, or from a separate device via a communication interface (not shown).

Exemplary Processing

After handwritten or typeset input, including a number of strokes and forming a mathematical expression, is provided to a processing device, such as a tablet PC, or other processing device, according to one embodiment consistent with the subject matter of this disclosure, two auxiliary arrays of strokes, Array_Left and Array_Top, may be defined for a region including the typeset or handwritten input. For example, consider a mathematical expression including n strokes. S may be a set including the n strokes, $S=\{s_1, s_2, \ldots, s_n\}$. Array_Left may be set to strokes $\{a_1, a_2, \ldots, a_n\}$ and Array_Top may be set to strokes $\{b_1, b_2, \ldots, b_n\}$ which may be sorted permutations of the set S. Thus, Array_Left may satisfy an ordering relation, such that $a_1 \leq a_2 \leq \ldots \leq a_n$. Similarly, Array_Top may satisfy and ordering relation, such that $b_1 \leq b_2 \leq \ldots \leq b_n$.

The ordering relations may be defined such that:

In Array_Left, $s_i \leq s_j$ if and only if a leftmost coordinate of RHULL(stroke $s_i$) is less than or equal to a leftmost coordinate of RHULL(stroke $s_j$); and In Array_Top, $s_i \leq s_j$ if and only if a topmost coordinate of RHULL(stroke $s_i$) is less than or equal to a topmost coordinate of RHULL(stroke $s_j$).

Figure 2:
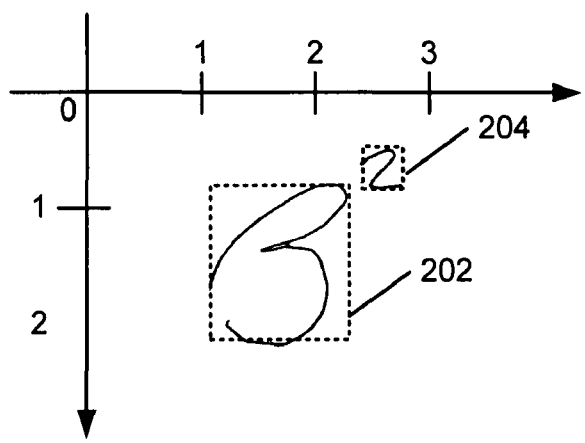
FIGS. 2-7 and 9 illustrate exemplary mathematical expressions, which may be parsed by embodiments consistent with the subject matter of this disclosure.

Consider, as an example, FIG. 2, in which ($S=\{s_1, s_2\}$, $s_1=\beta$, $s_2=2$). In Array_Left, one can see that $s_1 \leq s_2$ because a leftmost coordinate of RHULL("$\beta$") 202 is less than a leftmost coordinate of RHULL("2") 204. In Array_Top, one can see that $s_2 \leq s_1$ because a topmost coordinate of RHULL("2") 204 is less than a topmost coordinate of RHULL("$\beta$") 202.

In an embodiment, partitioning may begin by examining a set of strokes included in a region R. Each partition of a region may define two new regions, which may be sub-regions of the partitioned region. For example, assuming that a region R is partitioned such that $R=\{R_1, R_2\}$, then $R_1 \cap R_2 = 0$ and $R_1 \cup R_2 = R$.

In a first stage, strokes of a region may be ordered according to a left-to-right ordering relation. In one embodiment, a global array, which we call Global-Array-Left, may be created on a complete set of input strokes. Auxiliary array Array_Left may be created for a sub-region by going through Global-Array-Left and only including, in order, strokes of Global-Array-Left that belong to the sub-region. Auxiliary array Array-Left may be used to determine whether one of a group of rules or conditions is satisfied among the strokes. In one embodiment, the conditions may be a left-right simple strong condition, a superscript condition, a subscript condition, and a brackets condition.

According to the left-right simple strong condition, a region, R, of strokes $r_1, r_2, \ldots, r_k$, may be partitioned into two sub-regions, $R_1$ and $R_2$, where $R_1=\{r_1, r_2, \ldots, r_l\}$ and $R_2=\{R_{l+1}, r_{l+2}, \ldots, r_k\}$, if a rightmost coordinate of RHULL($R_1$) is less than or equal to a leftmost coordinate of RHULL($r_{l+1}$). That is, a region, R, may be partitioned into two regions, $R_1$ and $R_2$, when the regions may be separated by a vertical line. No more than k-1 partitions of the form $R_1=\{r_1, r_2, \ldots, r_l\}$ and $R_2=\{R_{l+1}, r_{l+2}, \ldots, r_k\}$ may be created from region R using the left-to-right ordering relation because there are only k-1 possible ways of choosing "l". A number of partitions that could be created in this step is linear compared to a number of strokes included in the region, while a number of all possible partitions is exponential.

The superscript condition may be satisfied with respect to strokes $r_l$ and $r_{l+1}$ when the strokes $r_l$ and $r_{l+1}$ are positioned such that stroke $r_l$ is positioned like a base and stroke $r_{l+1}$ is positioned like a superscript to the base. That is, the superscript condition is satisfied with respect to strokes $r_l$ and $r_{l+1}$ when a center of mass of stroke $r_{l+1}$ is right and up with respect to a center of mass of stroke $r_l$. A center of mass of a stroke may be determined by calculating an average horizontal axis coordinate and an average vertical axis coordinate of the stroke. Partitioning of a region satisfying the superscript condition may result in a first sub-region including a stroke representing the superscript and a second sub-region including remaining strokes not included in the first sub-region.

The subscript condition may be satisfied with respect to strokes $r_l$ and $r_{l+1}$ when the strokes $r_l$ and $r_{l+1}$ are positioned such that stroke $r_l$ is positioned like a base and stroke $r_{l+1}$ is positioned like a subscript to the base. That is, the subscript condition is satisfied with respect to strokes $r_l$ and $r_{l+1}$ when a center of mass of stroke $r_{l+1}$ is right and down with respect to a center of mass of stroke $r_l$. Partitioning of a region satisfying the subscript condition may result in a first sub-region including a stroke representing the subscript and a second sub-region including remaining strokes not included in the first sub-region.

Figure 3:
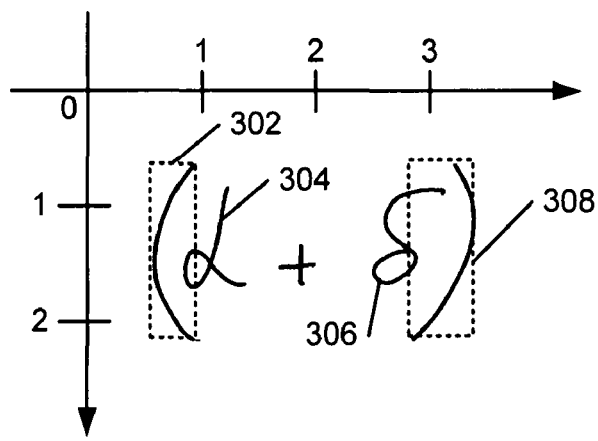

The brackets condition may be satisfied with respect to strokes $r_l$ and $r_{l+1}$ when (1) a height of stroke $r_l$ is sufficiently larger than a width of stroke $r_l$ and a center of mass of stroke $r_{l+1}$ is between a top coordinate and a bottom coordinate of RHULL($r_l$), or (2) when a height of stroke $r_{l+1}$ is sufficiently larger than a width of stroke $r_{l+1}$ and a center of mass of stroke $r_l$ is between a top coordinate and a bottom coordinate of RHULL($r_{l+1}$). This condition can be observed by referring to FIG. 3, in which a height of RHULL("(") 302 is sufficiently larger than a width of stroke "("304 and a center of mass of stroke "$\alpha$" 304 is between a top and bottom coordinate of RHULL("(") 302. Further, a height of RHULL(")") 308 is sufficiently larger than a width of stroke ")" 306 and a center of mass of stroke "$\delta$" 306 is between a top coordinate and a bottom coordinate of RHULL(")") 308. Partitioning of a region satisfying the brackets condition may result in a first sub-region including a stroke representing a bracket and a second sub-region including remaining strokes not included in the first sub-region.

In a second stage, strokes may be arranged according to a top-down ordering relation. In one embodiment, a global array, which we call Global-Array-Top, may be previously created on a complete set of strokes. Auxiliary array Array-Top may be created for a sub-region by going through Global-Array-Top and only including, in order, strokes of Global-Array-Top that belong to the sub-region. Auxiliary array Array-Top may be used to determine whether one of a group of conditions is satisfied among the strokes. In one embodiment, the conditions may be a top-down simple strong condition and a horizontal fraction condition.

According to the top-down simple strong condition, a region, R of strokes $r_1, r_2, \ldots, r_k$, may be partitioned into two sub-regions, $R_1$ and $R_2$, where $R_1=\{r_1, r_2, \ldots, r_l\}$ and $R_2=\{r_{l+1}, r_{l+2}, \ldots, r_k\}$, if a bottommost coordinate of RHULL($R_1$) is less than or equal to a topmost coordinate of RHULL($r_{l+1}$). That is, a region, R, may be partitioned into two regions, $R_1$ and $R_2$, when a horizontal line could separate the regions. No more than k-1 partitions of the form $R_1=\{r_1, r_2, \ldots, r_l\}$ and $R_2=\{R_{l+1}, r_{l+2}, \ldots, r_k\}$ may be created from region R using the top-down ordering relation because there are only k-1 possible ways of choosing "l". A number of partitions that could be created in this step is linear compared to a number of strokes included in the region, while a number of all possible partitions is exponential.

The horizontal fraction condition may be satisfied when the strokes $r_i$ and $r_{i+1}$ have a feature that a fraction line has. A fraction line may be nearly or completely horizontal, at least almost as wide as a complete sub region, and may be easily detected. Assuming that stroke $r_{i+1}$ is the horizontal fraction line, most or all of $r_i$ may be above the horizontal fraction line.

Figure 4:
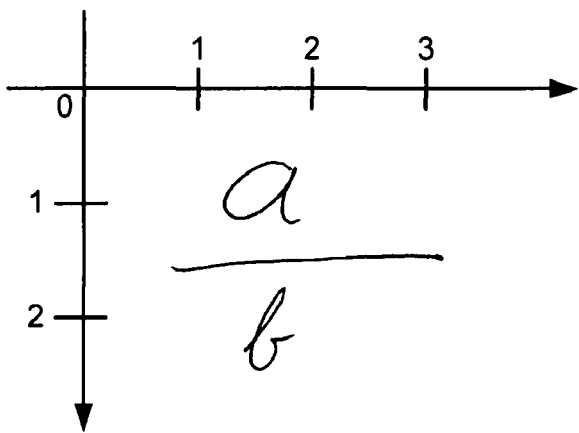
Figure 5:
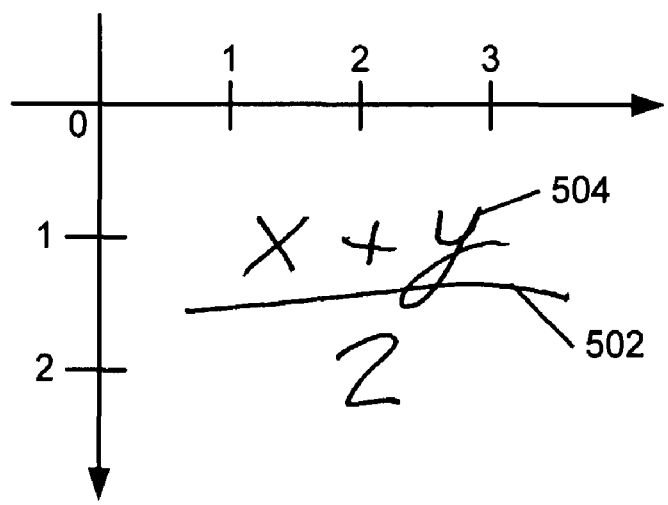

FIG. 4 illustrates an example of strokes forming a fraction. In this example, the top-down simple strong condition may create a correct partition because there is no geometric overlap that would hinder partitioning. However, in FIG. 5, because stroke 504 crosses horizontal fraction line 502, the top-down simple strong condition cannot separate stroke 504 from fraction line 502 because a bottommost coordinate of RHULL("y") is not smaller than a topmost coordinate of horizontal fraction line 502. Using the horizontal fraction condition, a correct partition may be created to separate stroke 504 from horizontal fraction line 502.

In a third stage, an ordering type is outside-inside. In this stage, a region R may be partitioned into $R_1$ and $R_2$, where $R_1=\{r_1, r_2, \ldots, r_m\}$ and $R_2$=remaining strokes of R not in $R_1$, if and only if strokes of $R_1$ look like a square root symbol, $\sqrt{}$, and strokes of $R_2$ are almost completely within $R_1$. When the strokes of $R_1$ look like a square root symbol and the strokes of $R_2$ are almost completely within $R_1$, a square root condition is satisfied.

In order to detect a square root symbol in $R_1$, several first strokes may be combined from a left side of region $R_1$ with several first strokes from a top of region $R_1$. In this way, a square root symbol drawn with one or more strokes may be detected. In one embodiment, a maximum number of strokes to search for in $R_1$ may be a configurable parameter. Auxiliary arrays, Array-Left and Array-Top, may be used in order to find the one or more strokes that make up the square root symbol. The square root condition may be satisfied when a leftmost coordinate of RHULL($R_1$) is smaller than a leftmost coordinate of RHULL($R_2$) and a topmost coordinate of RHULL($R_1$) is smaller than a topmost coordinate of RHULL($R_2$). A portion of region $R_2$ may be outside of region $R_1$ at a bottom and right side portion of the square root symbol.

Figure 6A:
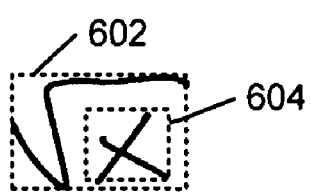
Figure 6B:
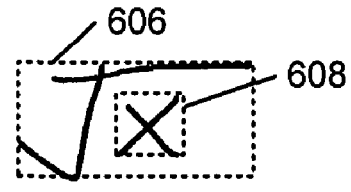
Figure 6C:
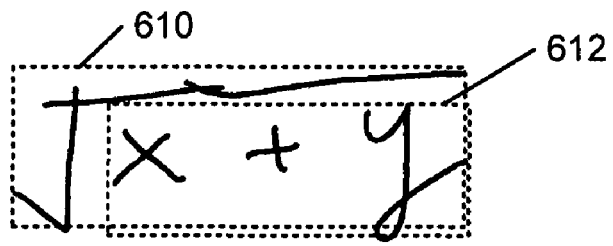

With respect to an example illustrated in FIG. 6A, one can see that a leftmost coordinate of RHULL($R_1$) 602 is smaller than a leftmost coordinate of RHULL($R_2$) 604 and a topmost coordinate of RHULL($R_1$) 602 is smaller than a topmost coordinate of RHULL($R_2$) 604. With respect to an example illustrated in FIG. 6B having a two-stroke square root symbol, a leftmost coordinate of RHULL($R_1$) 606 is smaller than a leftmost coordinate of RHULL($R_2$) 60 and a topmost coordinate of RHULL($R_1$) 606 is smaller than a topmost coordinate of RHULL($R_2$) 608. With respect to an example illustrated in FIG. 6C having a three stroke square root symbol, a leftmost coordinate of RHULL($R_1$) 610 is smaller than a leftmost coordinate of RHULL($R_2$) 612 and a topmost coordinate of RHULL($R_1$) 610 is smaller than a topmost coordinate of RHULL($R_2$) 612.

In a fourth stage, ordering type may be diagonal. In this stage, a region R may be partitioned into $R_1$ and $R_2$, where $R_1=\{r_1, r_2, \ldots, r_m\}$ and $R_2$=remaining strokes of R not in $R_1$, if and only if a diagonal condition is satisfied. The diagonal condition may be satisfied if there is a stroke $r_x$ in R, such that $r_x$ represents a diagonal line from an approximate bottom-left corner of RHULL(R) to an approximate top-right corner of RHULL(R). The diagonal condition and diagonal ordering may be used to parse integer fractions such as an integer fraction shown in FIG. 7, which satisfies the diagonal condition because of diagonal line 702. Thus, the strokes of FIG. 7 may be parsed into a region including "1" and "/", and a second region in including "2". Further parsing of the region including strokes "1" and "/" may create a partition with a first region including stroke "1" and a second region including stroke "/", again using the diagonal condition. Another parsing of FIG. 7 may result in a region including "1" and a second region including "/" and "2".

Figure 8A:
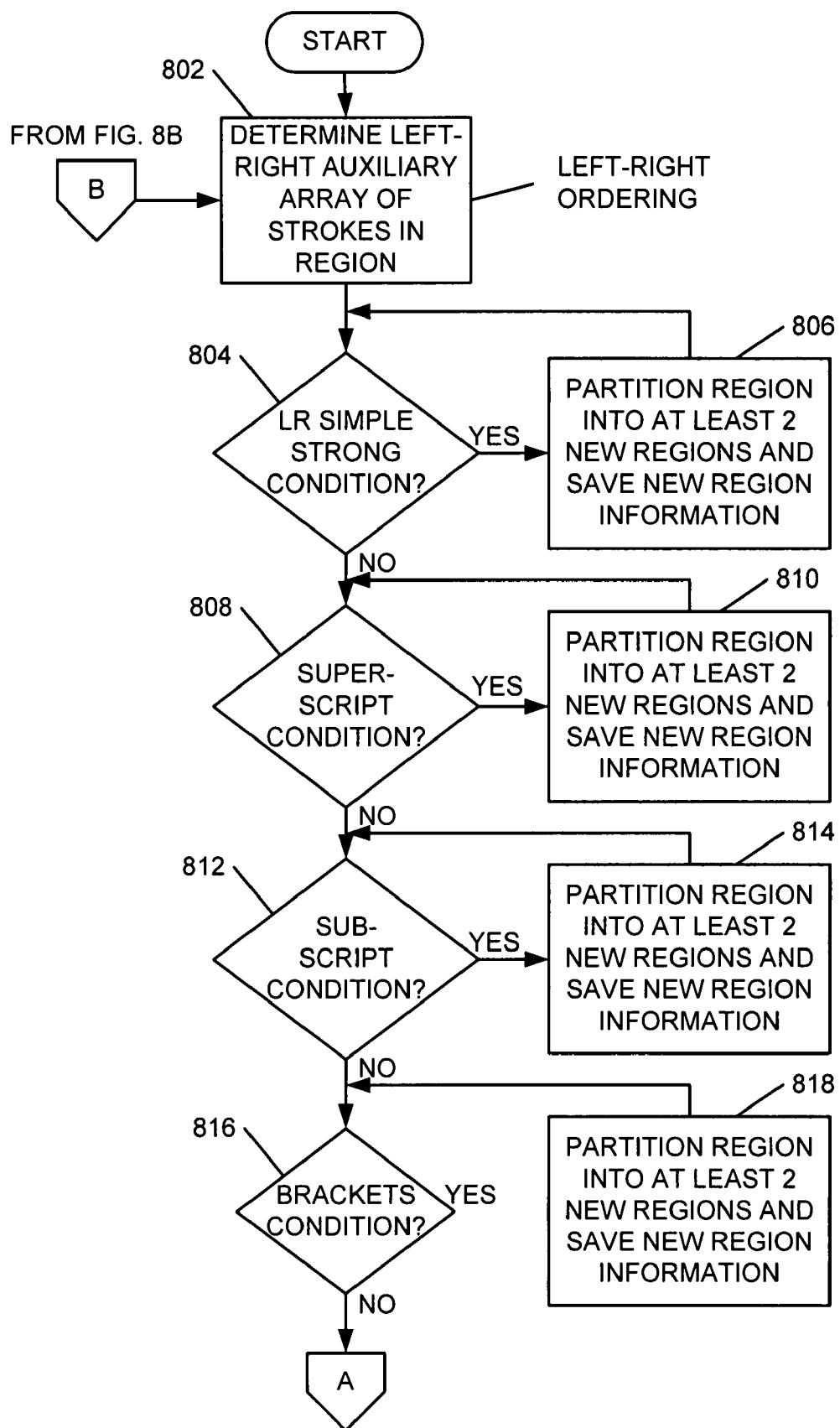
FIGS. 8A-8B are flowcharts, which illustrate a process for parsing a mathematical expression in an exemplary embodiment consistent with the subject matter of this disclosure.
Figure 8B:
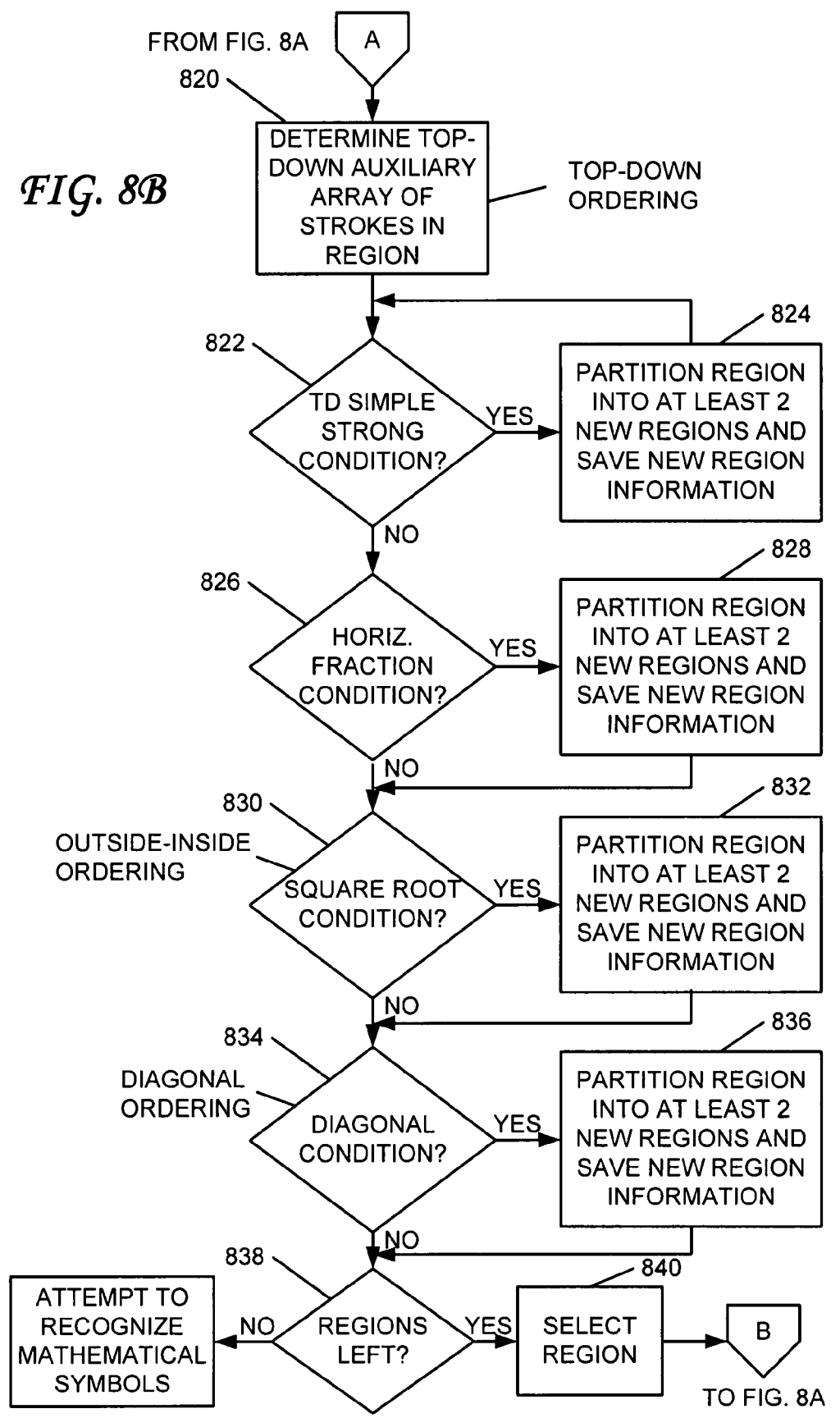

FIGS. 8A and 8B show an exemplary flowchart of processing, which may be performed in embodiments consistent with the subject matter of this disclosure for parsing a mathematical expression. A processing device, such as, for example, processing device 100, may arrange an auxiliary array, Array_Left, such that strokes representing a mathematical expression in a region may be ordered according to a left-right ordering relation, as previously described (act 802). Next, the processing device may determine whether a left-right simple strong condition is satisfied from among the strokes of the region (act 804). As previously mentioned, the left-right simple strong condition is satisfied if a rightmost coordinate of RHULL($R_1$) is less than or equal to a leftmost coordinate of RHULL($r_{i+1}$), where $R_1=\{r_1, r_2, \ldots, r_i\}$. If the left-right simple strong condition is satisfied, then the region may be partitioned into 2 or more regions. In one embodiment, the region may be partitioned into $R_1$ and $R_2$, where $R2=\{r_{i+1}, r_{i+2}, \ldots, r_k\}$ and information with respect to the newly partitioned regions may be saved (act 806). Act 804 may be repeated to determine whether another partitioning of the region may satisfy the left-right simple strong condition.

If, at act 804, the processing device does not find any partitions or any additional partitions satisfying the left-right simple strong condition (assuming some partitions were previously created) with respect to the region being examined, then the processing device may determine whether a superscript condition is satisfied by the strokes in the region being examined (act 808). The superscript condition is satisfied when stroke $r_i$ is positioned as a base and stroke $r_{i+1}$ is positioned as a superscript, having a center of mass in a position up and right with respect to stroke $r_i$. If the subscript condition is satisfied, then the region being examined may be partitioned into at least two regions, according to the subscript condition, and information with respect to the newly partitioned regions may be saved (act 810). In one embodiment, the region may be partitioned into exactly two regions. Act 808 may be repeated to determine whether another partitioning of the region may satisfy the superscript condition.

If, at act 808, the processing device does not find any partitions or any additional partitions satisfying the subscript condition, (assuming some partitions were previously created) with respect to the region being examined, then the processing device may determine whether a subscript condition is satisfied by the strokes in the region being examined (act 812). The subscript condition is satisfied when stroke $r_i$ is positioned like a base and stroke $r_{i+1}$ is positioned like a subscript, having a center of mass being in a position down and right with respect to stroke $r_i$. If the subscript condition is satisfied, then the region being examined may be partitioned into at least two regions, according to the subscript condition, and information with respect to the newly partitioned regions may be saved (act 814). In one embodiment, the region may be partitioned into exactly two regions. Act 812 may be repeated to determine whether another partitioning of the region may satisfy the subscript condition.

If, at act 812, the processing device does not find any partitions or any additional partitions satisfying the subscript condition, (assuming some partitions were previously created) with respect to the region being examined, then the processing device may determine whether a brackets condition is satisfied by the strokes in the region being examined (act 816). The brackets condition is satisfied when a height of stroke $r_l$ is sufficiently larger than a width of the stroke $r_l$ and a center of mass of stroke $r_{l+1}$ is between a topmost coordinate and a bottommost coordinate of RHULL($r_l$), or when a height of stroke $r_{l+1}$ is sufficiently larger than a width of the stroke $r_{l+1}$ and a center of mass of stroke $r_l$ is between a topmost coordinate and a bottommost coordinate of RHULL($r_{l+1}$). If the brackets condition is satisfied, then the region being examined may be partitioned into at least two regions, according to the brackets condition, and information with respect to the newly partitioned regions may be saved (act 818). In one embodiment, the region may be partitioned into exactly two regions. Act 816 may be repeated to determine whether another partitioning of the region may satisfy the brackets condition.

If, at act 816, the processing device does not find any partitions or any additional partitions satisfying the brackets condition, (assuming some partitions were previously created) with respect to the region being examined, then a top-down ordering stage may be entered and the processing device may then arrange an auxiliary array, Array_Top, such that strokes representing at least a portion of the mathematical expression in a region may be ordered according to a top-down ordering relation, as previously described (act 820; FIG. 8B). Next, the processing device may determine whether a top-down simple strong condition is satisfied from among the strokes of the region (act 822). As previously mentioned, the top-down simple strong condition is satisfied if a bottommost coordinate of RHULL($R_1$) is less than or equal to a topmost coordinate of RHULL($r_{l+1}$), where $R_1=\{r_1, r_2, \ldots, r_l\}$. If the top-down simple strong condition is satisfied, then the region may be partitioned into 2 or more regions. In one embodiment, the region may be partitioned into exactly two regions $R_1$ and $R_2$, where $R2=\{r_{l+1}, r_{l+2}, \ldots, r_k\}$ and information with respect to the newly partitioned regions may be saved (act 824). Act 822 may be repeated to determine whether another partitioning of the region may satisfy the top-down simple strong condition.

If, at act 822, the processing device does not find any partitions or any additional partitions satisfying the top-down simple strong condition (assuming some partitions were previously created) with respect to the region being examined, the processing device may determine whether a horizontal fraction condition is satisfied by the strokes in the region being examined (act 826). The horizontal fraction condition is satisfied when a horizontal stroke is at least almost as wide as the region being examined. If the horizontal fraction condition is satisfied, then the region being examined may be partitioned into at least two regions, one of which may include a stroke corresponding to the horizontal fraction line, and information with respect to the newly partitioned regions may be saved (act 828). In one embodiment, the region may be partitioned into exactly two regions.

Next, and outside-inside ordering stage may begin. In this stage, the region being examined may be partitioned into at least two newly created regions when a first region appears to be a square root symbol and a second region is completely or almost completely inside the first region (act 830). In one embodiment, the region may be partitioned into exactly two regions. As previously mentioned, several first strokes from a left side of the region being examined may be combined with several first strokes from a top of the region being examined, such that a square root symbol including one or more strokes may be detected. Further, the square root condition is satisfied when a leftmost coordinate of RHULL(first region) is smaller than a leftmost coordinate of RHULL(second region) and a topmost coordinate of RHULL(first region) is smaller than a topmost coordinate of RHULL(second region). If the processing device determines that the square root condition is satisfied, then the processing device may partition the region into at least two new regions, according to the square root condition, and information with respect to the new regions may saved (act 832).

If, at act 830, the processing device does not find any partitions satisfying the square root condition with respect to the region being examined, a diagonal ordering stage may be entered and the processing device may determine whether a diagonal condition is satisfied by the strokes in the region being examined (act 834). The diagonal condition is satisfied if and only there exists a stroke in the region being examined going from approximately a bottom left corner of RHULL (Region) to approximately a top right corner of RHULL (Region). If the diagonal condition is satisfied, then the region may be partitioned into at least two regions, one of which may include the stroke satisfying the diagonal condition, and information with respect to the newly partitioned regions may be saved (act 836). In one embodiment, the region may be partitioned into exactly two regions.

If, at act 834, the processing device does not find any partitions satisfying the diagonal condition with respect to the region being examined, then the processing device may determine whether there are any additional regions to examine, such as newly created sub-regions created during partitioning (act 838). If additional regions remain to be examined, then the processing device may select one of the regions (act 840). In some embodiments, the processing device may select one of the regions having a largest number of strokes. The processing device may then repeat acts 802 through 840.

If, at act 838, the processing device determines that no regions remain to be examined, then all mathematical symbols of the mathematical expression may be included in at least some of the regions created by this process and a symbol recognizer may be used to recognize the mathematical symbols (act 842).

Figures 7, 9:
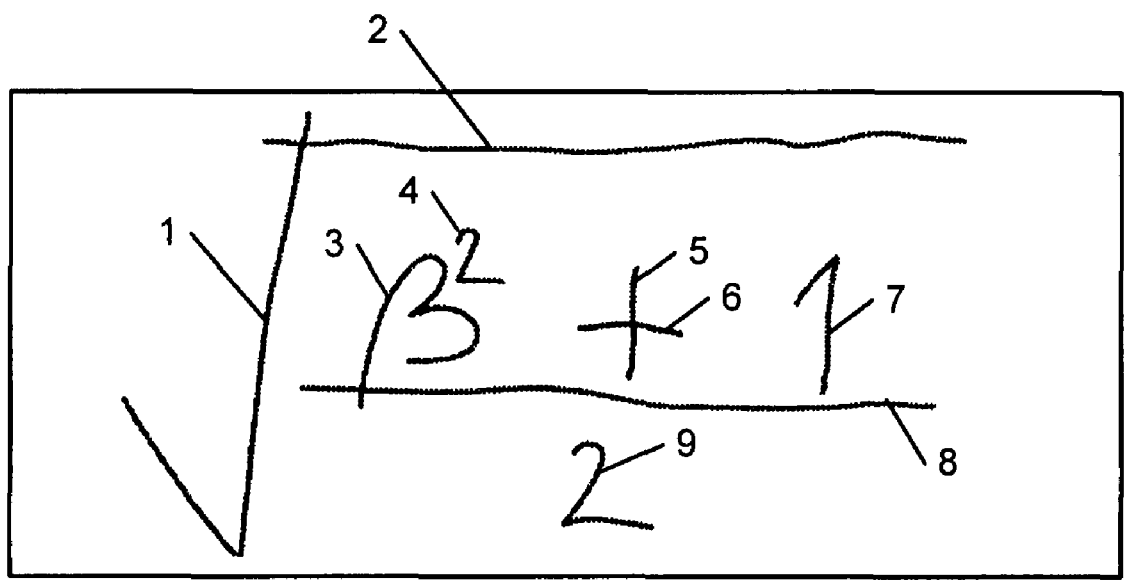

FIG. 9 illustrates an exemplary mathematical expression made up of strokes 1-9. In order to more clearly describe the process of FIGS. 8A and 8B, the parsing of at least a portion of the exemplary mathematical expression of FIG. 9 will be explained with respect to the flowchart of FIGS. 8A and 8B. First, auxiliary array of strokes, Array-Left, may be created and ordered (act 802). In this example, a global array of all strokes in a left-to-right order, Global-Array-Left may be {1, 2, 8, 3, 4, 9, 6, 5, 7}. Auxiliary array Array-Left, created for a particular region or sub-region, may be created by including, in order, only those strokes of Global-Array-Left, which are included in the region or the sub-region.

A processing device, such as processing device 100, may then determine whether the left-right simple strong condition is satisfied (act 804). The left-right simple strong condition is satisfied if a rightmost coordinate of RHULL($R_1$) is less than or equal to a leftmost coordinate of RHULL($r_{l+1}$), where $R_1=\{r_1, r_2, \ldots, r_l\}$. The left-right simple strong condition is currently not satisfied.

Next, the processing device may determine whether a superscript condition is satisfied (act 808). At this point, detection of a superscript condition may not cause partitioning of the region into two regions.

The processing device may then determine whether a subscript condition is satisfied (act 812). A subscript condition is not detected at this point.

The processing device may then determine whether a brackets condition is satisfied (act 816). At this point, the brackets condition is not satisfied.

In one embodiment, a global array, which we call Global-Array-Top, may have been previously created on a complete set of strokes in a top-down order. Auxiliary array Array-Top may be created for a region or a sub-region by going through Global-Array-Top and only including, in order, strokes of Global-Array-Top that belong to the region or the sub-region. In this example, Global-Array-Top, and, at this point, auxiliary array Array-Top, may be {1, 2, 4, 3, 7, 5, 6, 8, 9} (act 820; FIG. 8B).

The processing device may then determine whether a top-down simple strong condition is satisfied (act 822). The region may be partitioned into regions $R_1$ and $R_2$ if a bottom-most coordinate of RHULL($R_1$) is less than or equal to a topmost coordinate of RHULL($r_{l+1}$), where $R_1 = \{r_1, r_2, \ldots, r_l\}$. In other embodiments, the region may be partitioned into more than two regions. At this point, the top-down simple strong condition is not satisfied.

The processing device may then determine whether a horizontal fraction condition is satisfied (act 826). The horizontal fraction condition is satisfied when an approximately horizontal stroke is at least almost as wide as the region being examined. At this point, the horizontal fraction condition is not satisfied.

Next, in the outside-inside ordering stage, the processing device may determine whether, the region being examined may be partitioned into two newly created regions when a first region appears to be a square root symbol and a second region is completely or almost completely inside the first region (act 830). In this example, the square root condition is satisfied and partitioning creates two regions [{1,2}, {3, 4, 5, 6, 7, 8, 9}], and information with respect to the two new regions is saved (act 836). In another embodiment, more than two regions may be created.

A diagonal stage may then be entered and the processing device may determine whether a diagonal condition is satisfied by the strokes in the region being examined (act 834). The diagonal condition is satisfied if and only there exists a stroke in the region being examined going from approximately a bottom left corner of RHULL(Region) to approximately a top right corner of RHULL(Region). The diagonal condition is not satisfied at this point.

The processing device may then determine whether any regions remain to be examined (act 838). Because regions {1,2}, {3, 4, 5, 6, 7, 8, 9} remain to be examined, the processing device may select one of the regions to be examined next (act 840). Because region {1, 2} may not be further partitioned by any of the rules, we assume that the processing device selects region {3, 4, 5, 6, 7, 8, 9} to process next.

The processing device may then determine the auxiliary array, Array-Left, with respect to the region {3, 4, 5, 6, 7, 8, 9} (act 802; FIG. 8A). At this point, Array-Left ={8, 3, 4, 9, 6, 5, 7}. The processing device may then determine that the left-right simple strong condition (act 804), the superscript condition (act 808), the subscript condition (act 812), and the brackets condition (act 816) are not satisfied by the strokes in the region being examined.

Next, the processing device may determine the auxiliary array, Array-Top with respect to the region {3, 4, 5, 6, 7, 8, 9} by selecting, in order, only those strokes of Global-Array-Top that are included in the region (act 820; FIG. 8B). At this point, auxiliary array Array-Top={4, 3, 7, 5, 6, 8, 9}.

The processing device may then determine that the top-down simple strong condition is satisfied (act 822). Thus, the processing device may create a partition with two new regions [{4, 3, 7, 5, 6, 8}, {9}] and information with respect to the two new regions may be saved (act 824). In another embodiment, more than two new regions may be created. The processing device may again determine whether any additional partitioning of the region may be performed using the top-down simple strong condition (act 822). However, in this example, no additional partitioning of the region may be performed using the top-down simple strong condition.

Next, the processing device may determine that the horizontal fraction condition is satisfied (act 826) because stroke 8 is a stroke corresponding to a horizontal fraction line and is at least almost as wide as the sub-region being examined. Thus, the processing device may create a partition with two new regions [{4, 3, 7, 5, 6}, {8, 9}] and information with respect to the two new regions may be saved (act 828). In another embodiment, more than two new regions may be created.

The processing device may then determine that the square root condition is not satisfied (act 830) and that the diagonal condition is not satisfied (act 834).

The processing device may then determine that newly created regions remain to be examined (act 838) and may select one of the newly created regions to be examined (act 840). In this example, we assume that region {4, 3, 7, 5, 6, 8} is selected.

The processing device may then determine the auxiliary array, Array-Left, to be {8, 3, 4, 6, 5, 7} (act 802; FIG. 8A). The processing device may then determine that none of the conditions with respect to acts 804, 808, 812 and 816 are satisfied.

The processing device may then determine the auxiliary array, Array-Top, to be {4, 3, 7, 5, 6, 8} (act 820; FIG. 8B). The processing device may determine that the top-down simple strong condition is not met (act 822). However, the processing device may determine that the horizontal fraction condition is met based on stroke (act 826). Therefore, the processing device may partition the region into two new regions [{4, 3, 7, 5, 6}, {8}] based on the horizontal fraction condition and may save information with respect to the newly created regions (act 828).

Next, the processing device may determine that the square root condition (act 830) and the diagonal condition (act 834) are not satisfied by the region being examined. The processing device may then determine that additional regions remain to be examined (act 838) and may select one of the remaining regions to be examined (act 840). For the sake of this example, we assume that region {4, 3, 7, 5, 6} is selected next.

The processing device may then determine the auxiliary array, Array-Left, to be ordered as {3, 4, 6, 5, 7} (act 802; FIG. 8A). The processing device may then determine that the left-right simple strong condition is satisfied (act 804). The processing device may then create new regions [{3, 4, 6, 5}, {7}] and may save information with respect to the new regions (act 806). The processing device may then determine whether the left-right simple strong condition may be used to further partitioned the region being examined (act 804). In this example, the processing device may create new regions [{3, 4}, {6, 5, 7}] and may save information with respect to the newly created regions (act 806). The processing device may then determine that no further partitioning may be achieved using the left-right simple strong condition (act 804).

Next, the processing device may determine whether the superscript condition can be used to partition the region being examined (act 808). The processing device may then partition region {3, 4, 6, 5, 7} into [{3}, {4, 6, 5, 7}] and may save information with respect to the newly created regions (act 810). The processing device may then determine that no further partitioning may be achieved using the superscript condition (act 808) and that the superscript condition (act 808), the subscript condition (act 812) and the brackets condition (act 816) are not satisfied.

The processing device may then determine the auxiliary array, Array-Top (act 820; FIG. 8B), and may further determine that the top-down simple strong condition (act 822), the horizontal fraction condition (act 826), the square root condition (act 830), and the diagonal condition (act 834) are not satisfied. The processing device may then determine that additional regions remain to be examined (act 838). For the sake of this example, we assume that the processing device selects region {8, 9} to be examined next (act 840).

The processing device may then perform acts 802-816 (FIG. 8A) with respect to region {8, 9}. However, no new partitioning is performed with respect to acts 802-816.

The processing device may then determine the auxiliary array, Array-Top, to be ordered as {8, 9} (act 820; FIG. 8B). The processing device may then determine that the region being examined satisfies the top-down simple strong condition (act 822). The processing device may then partition the region into regions [{8}, {9}] and may save information with respect to the newly created regions (act 824). The processing device may then attempt to further partition the region being examined using the top-down simple strong condition (act 822). However, no further partitioning may be achieved using the top-down simple strong condition on the region being examined.

The processing device may then determine that the horizontal fraction condition (act 826), the square root condition (act 830), and the diagonal condition (act 834) are not satisfied.

The processing device may then determine whether any regions remain to be examined (act 838) and may select a new region for examination (act 840). We assume that region {3, 4, 6, 5} is selected next to be examined (act 840).

After executing acts 802-806, the processing device may determine that the region being examined satisfies the left-right simple strong condition and the region being examined may be partitioned into regions [{3, 4}, {6, 5}]. The processing device may save information with respect to these newly created regions (act 806). The processing device may further determine that region {3, 4} satisfies the superscript condition (act 808). The processing device may then partition region {3, 4} into regions [{3}, {4}] and may save information with respect to these newly created regions (act 810).

Processing of the remaining regions may proceed according to the flowchart of FIGS. 8A and 8B until no further partitioning may be performed. At this point, each mathematical symbol of the mathematical expression is isolated in some of the partitioned regions and a symbol recognizer may be used to recognize the mathematical symbols (act 842).

FIG. 10 illustrates the partitioning performed by the processing device, the regions created, and the rule used to create the region. Note that an order of strokes listed in a region is irrelevant. That is, for example, a region {1, 2, 3, 4} is equivalent to a region {3, 4, 2, 1}.

FIG. 11 illustrates all of the regions created for the mathematical expression of FIG. 9. Note that only as 17 regions were examined. Of the 17 regions examined, seven regions include mathematical symbols, such as, a square root symbol, a number, a fraction line operator, a symbol (β), and an operator (+).

The process described by the flowchart of FIGS. 8A and 8B is exemplary. For example, in other embodiments other orderings of strokes may be employed, and additional or different rules may be used to partition a region into multiple sub-regions. Further, in other embodiments, acts may be performed in a different order than as presented above, and different or other acts may be performed.

Time complexity of the process described above is on an order of $N^2$, where N is a number of strokes. A number of regions created by the process is also on an order of $N^2$ regions, which may be called region complexity.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

The invention claimed is:

1. A machine-implemented method for parsing a mathematical expression comprising a plurality of strokes, the machine-implemented method comprising:

partitioning a plurality of strokes, included in a region, using a finite set of rules based, at least in part, on expected positioning of symbols and expected types of strokes, the partitioning a plurality of strokes further comprising:

determining an ordering of the plurality of strokes, within the region, according to an ordering relation, the ordering relation including at least one of a left-right ordering relation or a top-down ordering relation, the determining an ordering of the plurality of strokes further comprising:

defining a first array of strokes $\{a_1, a_2, \ldots, a_n\}$ such that $a_i$ is less than or equal to $a_{i+1}$ if and only if a leftmost coordinate of the stroke $a_i$, within a smallest axis aligned rectangle including the stroke $a_i$, is less than or equal to a leftmost coordinate of the stroke $a_{i+1}$, within a smallest axis aligned rectangle including the stroke $a_{i+1}$, when the ordering relation includes the left-right ordering relation, where a set S of n strokes is equal to $(s_1, s_2, \ldots, s_n)$, $\{a_1, a_2, \ldots, a_n\}$ is a first sorted permutation of the set S, and i is a value from 1 to (n−1), and defining a second array of strokes $\{b_1, b_2, \ldots, b_n\}$ such that $b_i$ is less than or equal to $b_{i+1}$ if and only if a topmost coordinate of the stroke $b_i$, within a smallest axis aligned rectangle including the stroke $b_i$, is less than or equal to a topmost coordinate of the stroke $b_{i+1}$, within a smallest axis aligned rectangle including the stroke $b_{i+1}$, when the ordering relation includes the top-down ordering relation, where $\{b_1, b_2, \ldots, b_n\}$ is a second sorted permutation of the set S; and determining whether a rule of the finite set of rules is satisfied based, at least partly, on the first array of strokes or the second array of strokes, and partitioning the region into a plurality of regions, each of the plurality of regions including at least one respective stroke of the plurality of strokes, when the rule of the finite set of rules is determined to be satisfied;

repeating the partitioning, using the finite set of rules, until no additional regions can be created according to the finite set of rules; and recognizing at least one symbol of the mathematical expression included in at least one region created by the partitioning, wherein the machine-implemented method is performed by a processing device.

2. The machine-implemented method of claim 1, wherein the partitioning of the plurality of strokes in the region using a finite set of rules based, at least in part, on expected positioning of symbols and expected types of strokes, further comprises:

retaining region information with respect to the plurality of strokes when the rule of the finite set of rules is determined to be satisfied.

3. The machine-implemented method of claim 1, wherein the partitioning of the plurality of strokes in the region using a finite set of rules based, at least in part, on expected positioning of symbols and expected types of strokes, further comprises:

determining a smallest axis-aligned rectangle including a first subset of the plurality of strokes, determining whether the first subset of the plurality of strokes satisfies one of the finite set of rules, retaining region information with respect to the first subset of the plurality of strokes when the first subset of the plurality of strokes is determined to satisfy the one of the finite set of rules, determining whether a second subset of the plurality of strokes satisfies a second one of the finite set of rules, and retaining second region information with respect to the second subset of the plurality of strokes when the second subset of the at least a portion of the plurality of strokes is determined to satisfy the second one of the finite set rules.

4. The machine-implemented method of claim 1, wherein the partitioning of the plurality of strokes in the region using a finite set of rules based, at least in part, on expected positioning of symbols and expected types of strokes, further comprises:

determining a smallest axis-aligned rectangle including a subset of the plurality of strokes, determining whether the subset of the plurality of strokes satisfies one of the finite set of rules, and retaining region information with respect to the subset of the plurality of strokes when the subset of the plurality of strokes is determined to satisfy the one of the finite set rules.

5. The machine-implemented method of claim 1, wherein the partitioning of the plurality of strokes in the region using a finite set of rules based, at least in part, on expected positioning of symbols and expected types of strokes, further comprises:

determining an ordering of the at least a portion of the plurality of strokes according to second ordering relation, the second ordering relation including at least one of an outside-inside ordering, or a diagonal ordering, determining whether a subset the plurality of strokes satisfies one of the finite set of rules, and retaining region information with respect to the subset of the plurality of strokes when the subset of the plurality of strokes is determined to satisfy the one of the finite set rules.

6. The machine-implemented method of claim 1, wherein the plurality of strokes include handwritten strokes.

7. The machine-implemented method of claim 1, wherein the plurality of strokes include typeset symbols.

8. A processing device comprising:

at least one processing device;

a memory; and a bus connecting the at least one processing device with the memory, the memory comprising:

instructions for ordering a plurality of strokes of a region according to an ordering relation, the ordering relation including a left-right ordering relation, the plurality of strokes forming a mathematical expression, the instructions for ordering further comprising:

instructions for defining a first array of strokes $\{a_1, a_2, \ldots, a_n\}$ such that $a_i$ is less than or equal to $a_{i+1}$ if and only if a leftmost coordinate of the stroke $a_i$, within a smallest axis aligned rectangle including the stroke $a_i$, is less than or equal to a leftmost coordinate of the stroke $a_{i+1}$, within a smallest axis aligned rectangle including the stroke $a_{i+1}$, where a set S of n strokes is equal to $(s_1, s_2, \ldots, s_n\}$, $\{a_1, a_2, \ldots, a_n\}$ is a sorted permutation of the set S, and i is a value from 1 to (n−1);

instructions for determining whether a subset of the plurality of strokes of the region satisfy one of a finite set of rules, based, at least partly, on the first array of strokes;

instructions for retaining information defining a new region when the subset of the plurality of strokes of the region satisfies the one of the finite set of rules, instructions for repeatedly executing, for each new region, the instructions for determining whether a subset of a plurality of strokes of the region satisfy one of the finite set of rules, and the instructions for retaining information defining a new region when the subset of the plurality of strokes of the region satisfy the one of the finite set of rules, and instructions for recognizing at least one symbol of the mathematical expression included in at least one of the regions.

9. The processing device of claim 8, wherein the instructions for determining whether a subset of the plurality of strokes of the region satisfy one of a finite set of rules further comprise:

instructions for determining a rectangle hull region including the subset of the plurality of strokes of the region, and instructions for determining whether the subset of the plurality of strokes of the region satisfies a simple strong condition based, at least partly, on the first array of strokes.

10. The processing device of claim 8, wherein the memory further comprises:

instructions for determining whether a first ordered stroke of the subset of the plurality of strokes of the region satisfies a condition with respect to a second ordered stroke of the subset of the plurality of strokes, and instructions for defining a first region including the first ordered stroke and a second region including the second ordered stroke when the first ordered stroke satisfies the condition with respect to the second ordered stroke.

11. The processing device of claim 8, wherein the memory further comprises:

instructions for determining whether a first ordered stroke of the subset of the plurality of strokes of the region satisfies one of a superscript condition, a subscript condition, or a brackets condition with respect to a second ordered stroke of the subset of the plurality of strokes of the region, based, at least partly, on the first array of strokes, and instructions for defining a first region including the first ordered stroke and a second region including the second ordered stroke when the first ordered stroke satisfies the one of the superscript condition, the subscript condition, or the brackets condition with respect to the second ordered stroke.

12. The processing device of claim 8, wherein:

the ordering relation includes a top-down ordering relation, and the memory further comprises:

instructions for defining a second array of strokes $\{b_1, b_2, \ldots, b_n\}$ such that $b_i$ is less than or equal to $b_{i+1}$ if and only if a topmost coordinate of the stroke $b_i$, within a smallest axis aligned rectangle including the stroke $b_i$, is less than or equal to a topmost coordinate of the stroke $b_{i+1}$, within a smallest axis aligned rectangle including the stroke $b_{i+1}$, where $\{b_1, b_2, \ldots, b_n\}$ is a second sorted permutation of the set S;

instructions for determining whether a first ordered stroke of a subset of the plurality of strokes of the region satisfies a fraction condition with respect to a second ordered stroke of the plurality of strokes of the region based, at least in part, on the second array of strokes, and instructions for defining a first region including the first ordered stroke and a second region including the second ordered stroke when the first ordered stroke satisfies the fraction condition with respect to the second ordered stroke.

13. The processing device of claim 8, wherein:

the ordering relation further includes an outside-inside ordering relation, and the memory further comprises:

instructions for defining a second array of strokes $\{b_1, b_2, \ldots, b_n\}$ such that $b_i$ is less than or equal to $b_{i+1}$ if and only if a topmost coordinate of the stroke $b_i$, within a smallest axis aligned rectangle including the stroke $b_i$, is less than or equal to a topmost coordinate of the stroke $b_{i+1}$, within a smallest axis aligned rectangle including the stroke $b_{i+1}$, where $\{b_1, b_2, \ldots, b_n\}$ is a second sorted permutation of the set S;

instructions for determining whether at least one ordered stroke of a subset of the plurality of strokes of the region forms a square root-like symbol based, at least partly, on the first array of strokes and the second array of strokes, and instructions for defining a first region including the at least one ordered stroke and a second region including a subset of the plurality of strokes of the region without the at least one ordered stroke.

14. The processing device of claim 8, wherein:

the ordering relation further includes a diagonal ordering relation, and the memory further comprises:

instructions for determining whether at least one ordered stroke of a subset of the plurality of strokes of the region forms an approximate diagonal line from a lower left direction to an upper right direction, and instructions for defining a first region including the at least one ordered stroke and a second region including ones of the subset of the plurality of strokes of the region without the at least one ordered stroke included in the first region.

15. The processing device of claim 8, wherein the plurality of strokes of the region include at least one of handwritten strokes or typeset symbols.

16. A random access memory device, a flash memory device, or a read-only memory device having instructions for at least one processor of a processing device recorded thereon, such that when the instructions are executed by the at least one processor, the processing device performs a method comprising:

ordering a plurality of strokes of a region according to an ordering relation, the ordering relation including a left-right ordering relation, the plurality of strokes forming a mathematical expression, the instructions for ordering further comprising:

defining a first array of strokes $\{a_1, a_2, \ldots, a_n\}$ such that $a_i$ is less than or equal to $a_{i+1}$ if and only if a leftmost coordinate of the stroke $a_i$, within a smallest axis aligned rectangle including the stroke $a_i$, is less than or equal to a leftmost coordinate of the stroke $a_{i+1}$, within a smallest axis aligned rectangle including the stroke $a_{i+1}$, where a set S of n strokes is equal to $(s_1, s_2, \ldots, s_n)$, $\{a_1, a_2, \ldots, a_n\}$ is a sorted permutation of the set S and i is a value from 1 to (n−1);

using the first array of strokes and applying a plurality of rules to the region, including the plurality of strokes, to partition the region into a plurality of regions, each of the plurality of regions including a subset of the plurality of strokes, the plurality of rules being based, at least in part, on expected positioning of mathematical symbols and expected types of strokes representing a mathematical expression; and recognizing at least one mathematical symbol, each of the at least one mathematical symbol being included in one of the plurality of regions.

17. The random access memory device, the flash memory device, or the read-only memory device of claim 16, wherein:

the ordering relation further includes an outside-inside ordering relation, and one of the plurality of rules is for partitioning ones of the plurality of strokes forming a square root-like symbol, the partitioning forming a first region of the plurality of regions including the ones of the plurality of strokes forming the square root-like symbol and a second region of the plurality of regions including other ones of the plurality of strokes almost completely contained within the formed square root-like symbol.

18. The random access memory device, the flash memory device, or the read-only memory device of claim 16, wherein:

the ordering relation further includes a diagonal ordering relation, and one of the plurality of rules is for partitioning at least one of the plurality of strokes forming a horizontal fraction line or a diagonal fraction line, the partitioning forming a first region of the plurality of regions including the at least one of the plurality of strokes forming the horizontal fraction line or the diagonal fraction line and a second region of the plurality of regions including other ones of the plurality of strokes.

19. The random access memory device, the flash memory device, or the read-only memory device of claim 16, wherein one of the plurality of rules is for partitioning at least one of the plurality of strokes forming a superscript, the partitioning forming a first region of the plurality of regions including the at least one of the plurality of strokes forming the superscript and a second region of the plurality of regions including at least one other one of the plurality of strokes forming a base of the superscript.

20. The random access memory device, the flash memory device, or the read-only memory device of claim 16, wherein one of the plurality of rules is for partitioning at least one of the plurality of strokes forming a subscript, the partitioning forming a first region of the plurality of regions including the at least one of the plurality of strokes forming the subscript and a second region of the plurality of regions including at least one other one of the plurality of strokes forming a base of the subscript.

* * * * *